United States Patent [19]
DiRisio

[11] Patent Number: 6,132,112
[45] Date of Patent: Oct. 17, 2000

[54] CAMERA WITH BLOCKING DEVICE TO PREVENT ACCIDENTAL SHUTTER OPENING DUE TO MECHANICAL SHOCK SUCH AS WHEN CAMERA JARRED OR DROPPED

[75] Inventor: Anthony DiRisio, Rochester, N.Y.

[73] Assignee: Eastman Kodak Company, Rochester, N.Y.

[21] Appl. No.: 09/307,950

[22] Filed: May 10, 1999

[51] Int. Cl.[7] ................................................ G03B 17/38
[52] U.S. Cl. .......................................... 396/503; 396/502
[58] Field of Search ..................................... 396/502, 503

[56] References Cited

U.S. PATENT DOCUMENTS 3,358,572  12/1967  Steisslinger .
4,119,987  10/1978  Beach .
4,403,844   9/1983  Namai .

*Primary Examiner*—Alan A. Mathews
*Attorney, Agent, or Firm*—Roger A. Fields

[57] ABSTRACT

A camera comprising an aperture through which ambient light is passed to cause a film exposure, a shutter blade movable open to uncover the aperture and movable closed to re-cover the aperture and susceptible of being moved accidentally due to mechanical shock such as when the camera is dropped or jarred, and a shutter release button manually depressible for the shutter blade to be moved open to uncover the aperture, is characterized in that a blocking device is positioned adjacent or adjoining the shutter blade to prevent the shutter blade from being moved open to uncover the aperture due to mechanical shock, and is movable away from the shutter blade to permit the shutter blade to be moved open to uncover the aperture, and the shutter release button is connected with a driver that moves the blocking device away from the shutter blade to permit the shutter blade to be moved open to uncover the aperture only when the shutter release button is manually depressed.

7 Claims, 6 Drawing Sheets

CAMERA WITH BLOCKING DEVICE TO PREVENT ACCIDENTAL SHUTTER OPENING DUE TO MECHANICAL SHOCK SUCH AS WHEN CAMERA JARRED OR DROPPED

CROSS-REFERENCE TO RELATED APPLICATION

Reference is made to commonly assigned co-pending application Ser. No. 09/283,407 entitled CAMERA WITH BLOCKING DEVICE TO PREVENT ACCIDENTAL SHUTTER OPENING DUE TO MECHANICAL SHOCK SUCH AS WHEN CAMERA JARRED OR DROPPED and filed Apr. 1, 1999 in the names of Anthony DiRisio and Thomas S. Albrecht.

The cross-referenced application is incorporated in this application.

FIELD OF THE INVENTION

The invention relates generally to the field of photography, and in particular to cameras. More specifically, the invention relates to a camera that can prevent accidental shutter opening due to mechanical shock such as when the camera is jarred or dropped.

BACKGROUND OF THE INVENTION

It is conventional for a camera to have an aperture through which ambient light is passed to cause a film exposure, at least one shutter blade pivotable open to uncover the aperture to permit ambient light to pass through the aperture and pivotable closed to re-cover the aperture, a spring-urged shutter actuator movable to pivot the shutter blade open, and a shutter release button manually depressible to release the shutter actuator to permit the shutter actuator to pivot the shutter blade open.

Problem

In relatively inexpensive simple cameras, for example so-called one-time-use or disposable cameras, the shutter blade may be susceptible of being moved open accidentally, i.e. without the shutter release button having been manually depressed. This can be caused by a mechanical shock to the camera such as when the camera is dropped or jarred. The result is an unintended wasted exposure.

The Cross-Referenced Application

The cross-referenced application discloses a camera of the type including an aperture through which ambient light is passed to cause a film exposure, a shutter blade pivotable open to uncover the aperture and pivotable closed to re-cover the aperture and susceptible of being pivoted accidentally due to mechanical shock such as when the camera is dropped or jarred, a spring-urged shutter actuator movable to pivot the shutter blade open to uncover the aperture, and a shutter release button manually depressible to release the shutter actuator to permit the shutter actuator to pivot the shutter blade open. A blocking device is fixed in place to block the shutter blade from being pivoted open to uncover the aperture due to mechanical shock. The shutter blade is supported to be translated away from the blocking device before it can be pivoted open. When the shutter release button is manually depressed, the shutter actuator is moved to first translate the shutter blade away from the blocking device and then to pivot the shutter blade open to uncover the aperture.

SUMMARY OF THE INVENTION

According to the invention a camera comprising an aperture through which ambient light is passed to cause a film exposure, a shutter blade movable open to uncover the aperture and movable closed to re-cover the aperture and susceptible of being moved accidentally due to mechanical shock such as when the camera is dropped or jarred, and a shutter release button manually depressible for the shutter blade to be moved open to uncover the aperture, is characterized in that:

a blocking device is positioned adjacent or adjoining the shutter blade to prevent the shutter blade from being moved open to uncover the aperture due to mechanical shock, and is movable away from the shutter blade to permit the shutter blade to be moved open to uncover the aperture; and the shutter release button is connected with a driver that moves the blocking device away from the shutter blade to permit the shutter blade to be moved open to uncover the aperture only when the shutter release button is manually depressed.

DETAILED DESCRIPTION OF THE INVENTION

Figure 1:
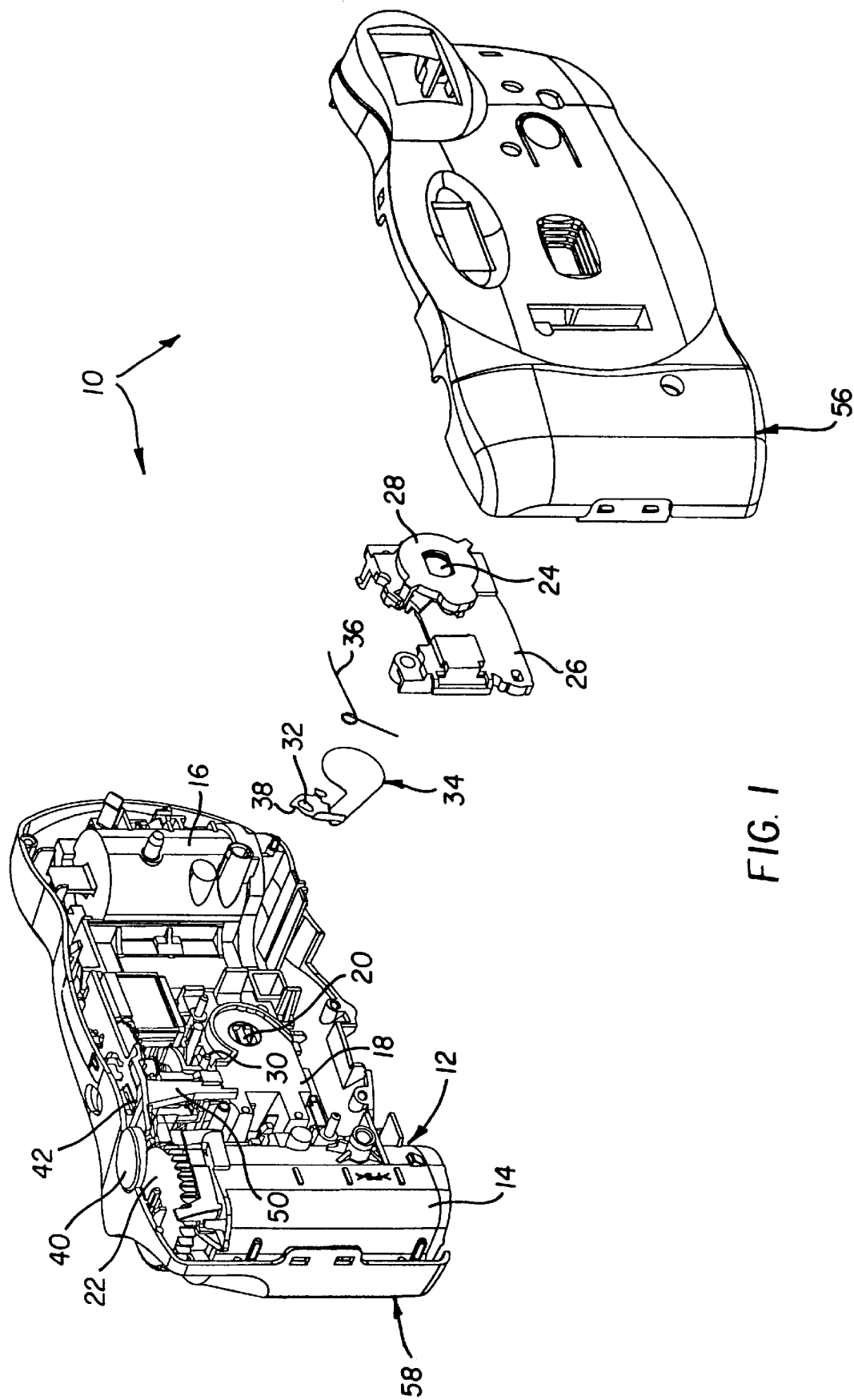
FIG. 1 is an exploded front perspective view of a one-time-use camera with a blocking device to prevent accidental shutter opening due to mechanical shock such as when the camera is dropped or jarred, according to a preferred embodiment of the invention.
Figure 2:
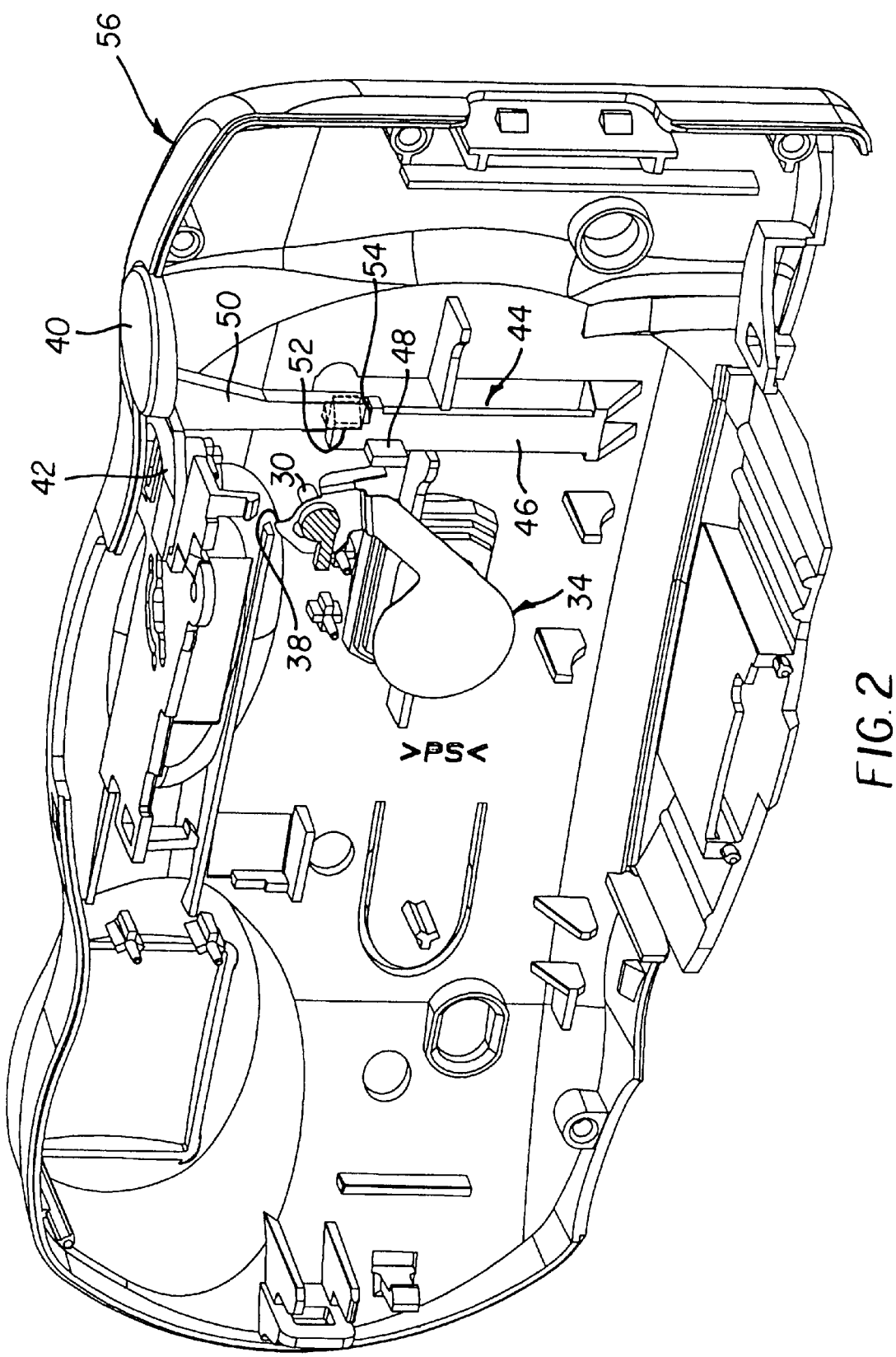
FIG. 2 is a perspective view of the blocking device and the shutter blade, showing the blocking device positioned adjacent the shutter blade to prevent the shutter blade from being moved open accidentally due to mechanical shock.
Figure 3:
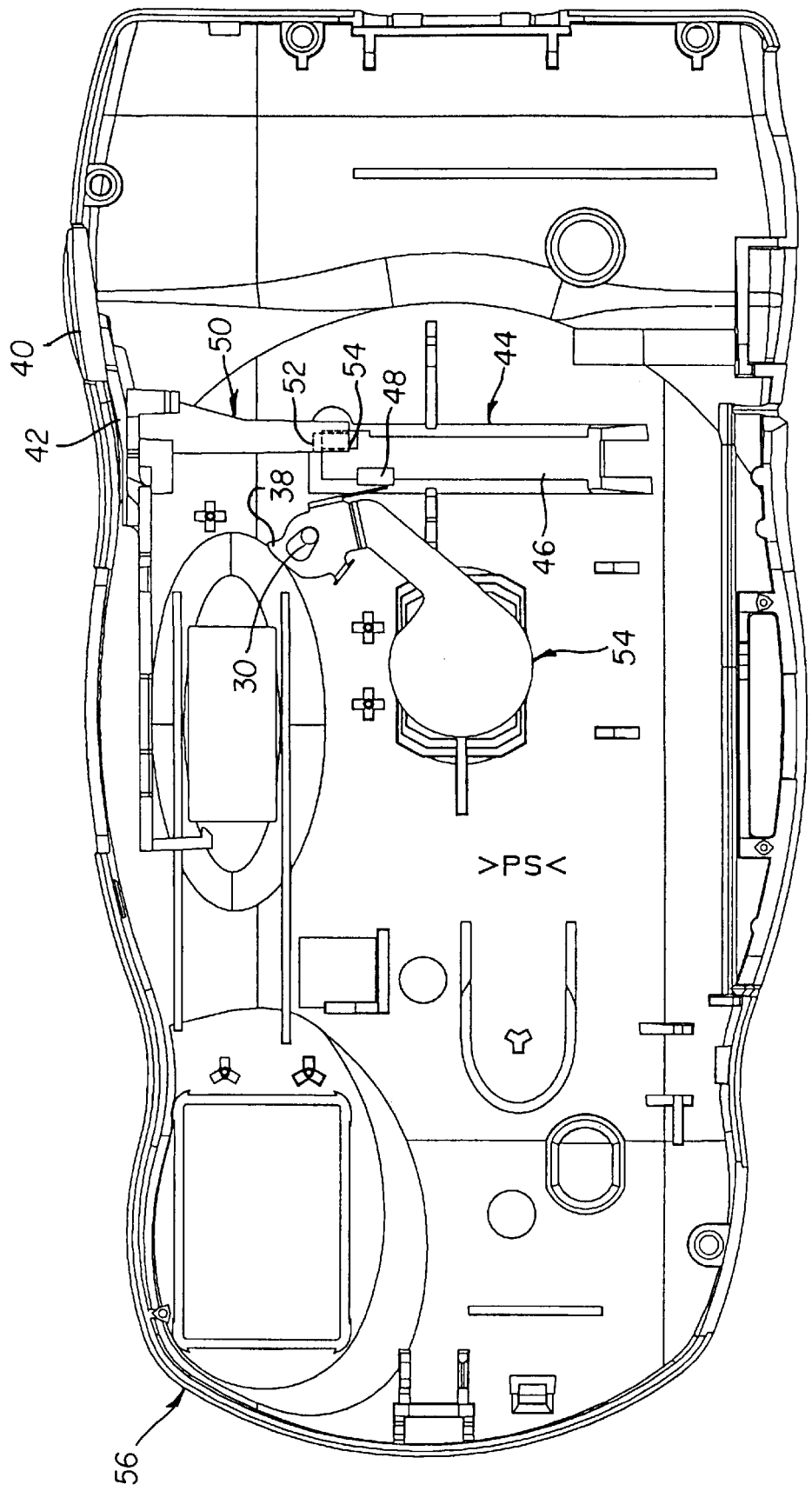
FIG. 3 is an elevation view of the blocking device and the shutter blade, as shown in FIG. 2.
Figure 4:
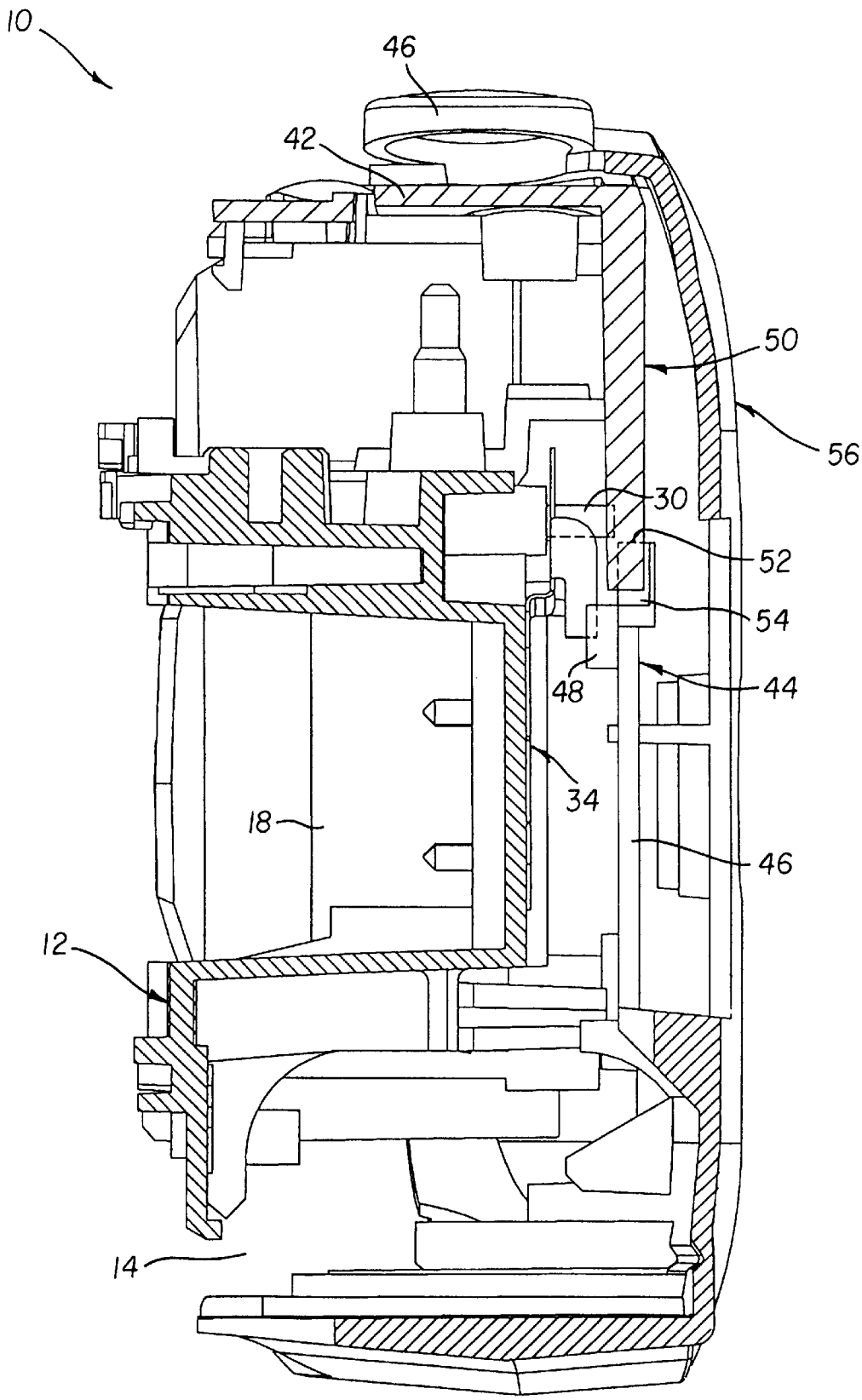
FIG. 4 is a side elevation view of the blocking device and the shutter blade, as shown in FIG. 2.

The invention is disclosed as being embodied preferably in a relatively simple inexpensive camera such as a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–6 partially show a one-time-use camera 10.

The one-time-use camera 10 is a simple point-and-shoot camera that includes an opaque plastic main body part 12 shown in FIG. 1. The main body part 12 has a rearwardly-open cartridge receiving chamber 14 that contains a conventional film cartridge (not shown), a rearwardly-open film supply chamber 16 that contains an unexposed filmstrip (not shown) which is prewound during camera manufacture from the film cartridge into the film supply chamber, and a rearwardly-open exposure chamber 18 behind a front aperture 20 through which ambient light is passed to expose successive imaging sections of the filmstrip.

A film winding thumbwheel 22 is rotatably engaged with a film spool inside the film cartridge in the cartridge receiving chamber 14. The film winding thumbwheel 22 is manually rotated counter-clockwise in FIG. 1 to wind each imaging section of the filmstrip exposed at the exposure chamber 18 into the film cartridge and to advance a fresh imaging section of the filmstrip from the film supply chamber 16 to the exposure chamber.

A fixed-focus taking lens 24 is held between a lens plate 26 and a lens retainer 28 which are connected together. The lens plate 26 is connected to the main body part 12 to position the taking lens 24 over the front aperture 20.

A fixed pivot pin 30 on the main body part 12 projects into a hole 32 in a shutter blade 34 to support the shutter blade for pivoting. The shutter blade 34 is pivoted open clockwise in FIG. 1 and counter-clockwise in FIGS. 2 and 3 to against a limit stop (not shown) on the main body part 12, to uncover the front aperture 20 to permit ambient light to pass from the taking lens 24 through the front aperture, and is pivoted closed counter-clockwise in FIG. 1 and clockwise in FIGS. 2 and 3 to re-cover the front aperture. A closing spring 36 biases the shutter blade 34 to be pivoted closed to re-cover the front aperture 20.

A shutter actuator (not shown) has an actuating protuberance that protrudes from a straight closed-end slot (not shown) in the main body part 12. An actuating spring (not shown) biases the shutter actuator to the right in FIG. 1 to advance the actuating protuberance against a tang 38 on the shutter blade 34 to pivot the shutter blade open to uncover the front aperture 20. Further details of the shutter actuator are disclosed in the incorporated cross-referenced application.

Figure 5:
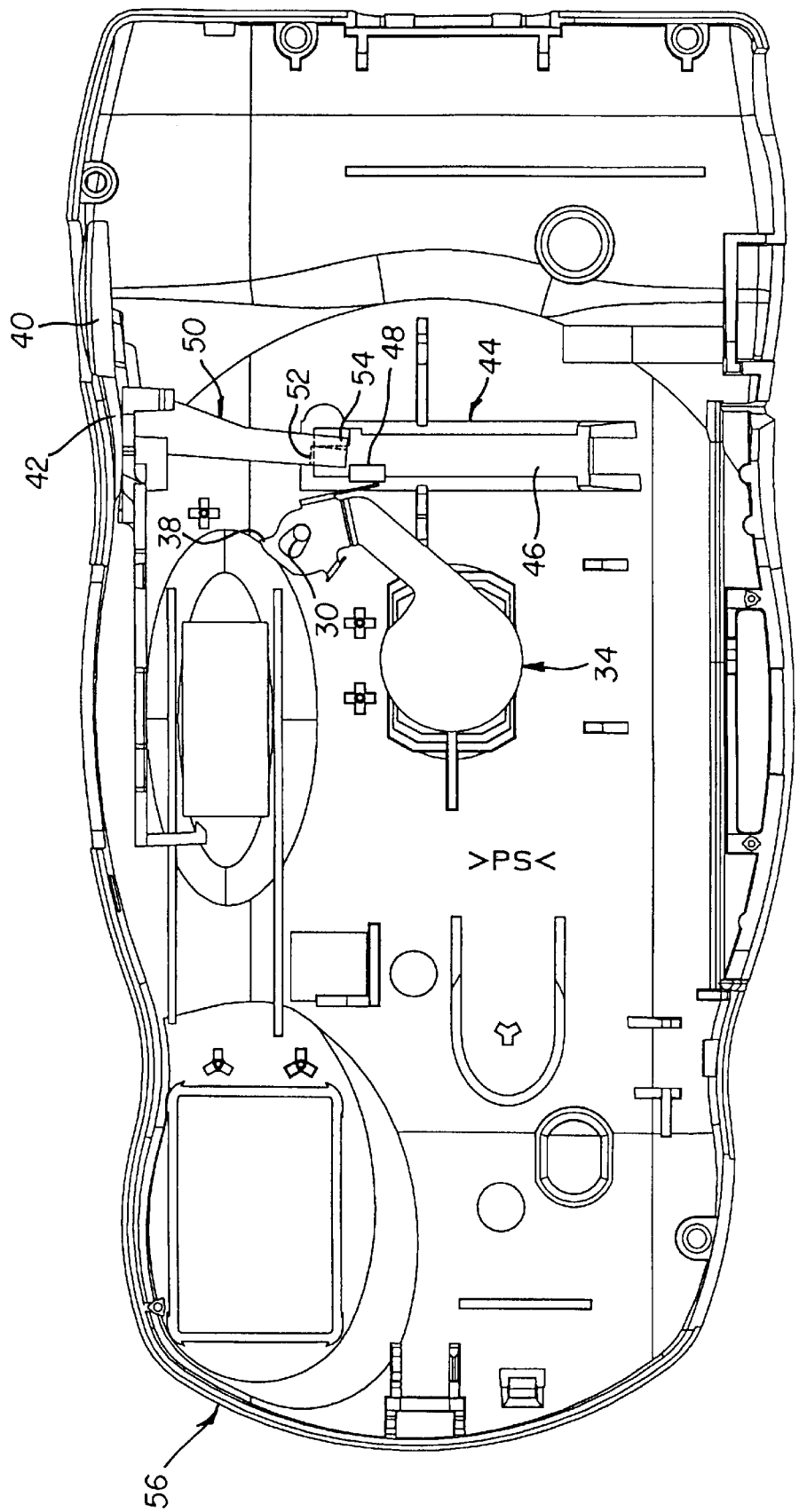
FIG. 5 is an elevation view of the blocking device and the shutter blade, showing the blocking device moved away from the shutter blade to permit the shutter blade to be moved open.

A shutter release button 40 is integrally connected with a resilient cantilevered beam 42 which is mounted atop the main body part 12 to support the shutter release button to be manually depressible. The shutter release button 40 can be manually depressed because the cantilevered beam 42 can be bent as shown in FIG. 5.

Figure 6:
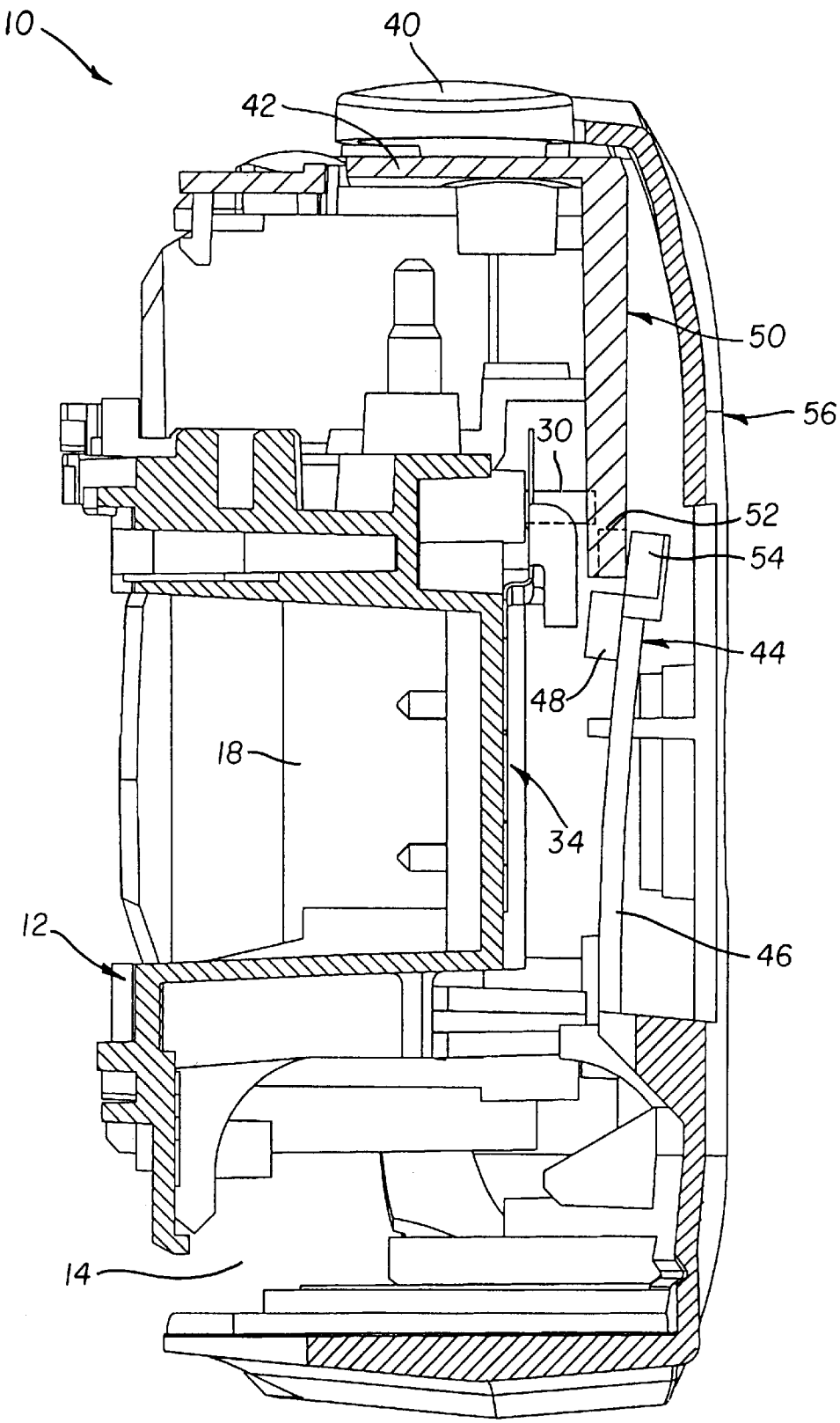
FIG. 6 is a side elevation view of the blocking device and the shutter blade, as shown in FIG. 5.

A blocking device 44 has a resilient cantilevered beam 46 integrally formed with the main body part 12 and has a stop 48 that projects from the beam. The stop 48 is positioned in FIGS. 2–4 adjacent or adjoining the shutter blade 34 to prevent the shutter blade from being moved open to uncover the front aperture 20 when the shutter blade is moved accidentally due to mechanical shock, such as when the camera 10 is dropped or jarred. Conversely, the stop 48 is moved away from the shutter blade 34 to permit the shutter blade to be moved open to uncover the front aperture 20 when the beam 46 is bent as shown in FIGS. 5 and 6.

A driver 50 is integrally connected with the shutter release button 40 and depends from the shutter release button as shown in FIGS. 1–4. The driver 50 has an inclined or beveled flat surface 52 that continuously contacts a parallel inclined or beveled flat surface 54 on the cantilevered beam 46 of the blocking device 44. When the shutter release button 40 is manually depressed as shown in FIGS. 5 and 6, the inclined surface 52 on the driver 50 is forced against the inclined surface of 54 on the cantilevered beam 46 to bend the beam as depicted in FIG. 6, in order to retract the stop 48 from the shutter blade 34. Thus, the shutter blade 34 is then freed to be moved open to uncover the front aperture 20.

A pair of opaque plastic front and rear cover parts 56 and 58 house the main body part 12 to complete the camera 10.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. cartridge receiving chamber
16. film supply chamber
18. exposure chamber
20. aperture
22. film winding thumbwheel
24. taking lens
26. lens plate
28. lens retainer
30. pivot pin
32. hole
34. shutter blade
36. closing spring
38. tang
40. shutter release button
42. cantilevered beam
44. blocking device
46. cantilevered beam
48. stop
50. driver
52. inclined surface
54. inclined surface
56. front cover part
58. rear cover part

What is claimed is:

1. A camera comprising an aperture through which ambient light is passed to cause a film exposure, a shutter blade movable open to uncover said aperture and movable closed to re-cover said aperture and susceptible of being moved accidentally due to mechanical shock such as when said camera is dropped or jarred, and a shutter release button manually depressible for said shutter blade to be moved open to uncover said aperture, is characterized in that:

a blocking device is positioned adjoining said shutter blade to prevent said shutter blade from being moved open to uncover said aperture due to mechanical shock, and is movable away from said shutter blade to permit said shutter blade to be moved open to uncover said aperture; and said shutter release button is connected with a driver that moves said blocking device away from said shutter blade to permit said shutter blade to be moved open to uncover said aperture only when said shutter release button is manually depressed.

2. A camera as recited in claim 1, wherein said blocking device and said driver have continuously contacting surfaces that permit said driver to move said blocking device away from said shutter blade only when said shutter release button is manually depressed.

3. A camera as recited in claim 1, wherein said contacting surfaces are a pair of parallel inclined surfaces.

4. A camera as recited in claim 1 or 2, wherein said blocking device includes a resilient support that is bent to move said blocking device away from said shutter blade, and said driver is rigid to bend said resilient support.

5. A camera as recited in claim 4, wherein said resilient support is a resilient cantilever beam.

6. A camera as recited in claim 1, wherein said driver depends from said shutter release button.

7. A camera comprising an aperture through which ambient light is passed to cause a film exposure, a shutter blade movable open to uncover said aperture and movable closed to re-cover said aperture and susceptible of being moved accidentally due to mechanical shock such as when said camera is dropped or jarred, and a shutter release button manually depressible for said shutter blade to be moved open to uncover said aperture, is characterized in that:

a shutter blade blocking device is positioned adjacent said shutter blade to contact said shutter blade to prevent said shutter blade from being moved open to uncover said aperture due to mechanical shock, and is movable away from said shutter blade to permit said shutter blade to be moved open to uncover said aperture; and said shutter release button is connected with a driver that moves said shutter blade blocking device away from said shutter blade to permit said shutter blade to be moved open to uncover said aperture only when said shutter release button is manually depressed.

* * * * *